United States Patent [19]
Keller

[11] Patent Number: 5,960,809
[45] Date of Patent: Oct. 5, 1999

[54] FUEL EQUALIZING SYSTEM FOR PLURALITY OF FUEL TANKS

[75] Inventor: Russell D. Keller, Portland, Oreg.

[73] Assignee: R.D.K. Corporation, Portland, Oreg.

[21] Appl. No.: 08/910,130

[22] Filed: Aug. 13, 1997

[51] Int. Cl.⁶ .................................................. F16K 17/19
[52] U.S. Cl. .......................... 137/12; 137/265; 137/100; 137/87.01
[58] Field of Search .................................. 137/265, 255, 137/98, 100, 87.01, 12; 123/514

[56] References Cited

U.S. PATENT DOCUMENTS

| | | |
|---|---|---|
| 658,915 | 10/1900 | Jacobsen . |
| 925,673 | 6/1909 | Zook . |
| 1,123,273 | 1/1915 | Gregersen . |
| 1,780,857 | 11/1930 | Barclay et al. . |
| 2,255,787 | 9/1941 | Kendrick . |
| 2,483,312 | 9/1949 | Clay . |
| 2,584,127 | 2/1952 | Harcum et al. . |
| 2,584,890 | 2/1952 | Leonard . |
| 2,860,651 | 11/1958 | Davies . |
| 2,860,652 | 11/1958 | Badger, Jr. . |
| 2,860,653 | 11/1958 | Taylor et al. ............................. 137/98 |
| 3,067,775 | 12/1962 | Brueder . |
| 3,198,212 | 8/1965 | Junck et al. . |
| 3,216,441 | 11/1965 | Thorsheim ............................ 137/87.01 |
| 3,346,012 | 10/1967 | Williams . |
| 3,528,454 | 9/1970 | Lewis . |
| 3,581,771 | 6/1971 | Garrison et al. . |
| 3,724,483 | 4/1973 | Hubbard . |
| 3,890,651 | 6/1975 | Wood . |
| 4,513,653 | 4/1985 | Varlemann . |
| 4,570,672 | 2/1986 | Wilke . |
| 4,722,358 | 2/1988 | Christensen . |
| 4,923,092 | 5/1990 | Kirschner et al. .................. 137/100 X |
| 5,020,566 | 6/1991 | Shoop ..................................... 137/265 |
| 5,183,071 | 2/1993 | Ogawa . |
| 5,481,871 | 1/1996 | McFadyen . |
| 5,551,664 | 9/1996 | Böke . |

*Primary Examiner*—Kevin Lee
*Attorney, Agent, or Firm*—Klarquist Sparkman Campbell Leigh & Whinston, LLP

[57] ABSTRACT

A fuel equalizing method and system for equalizing the amount of fuel in a plurality of fuel tanks connected to a motor, such as the diesel engine of a truck, is described. The system includes an equalization valve having a first common passage with two fuel inlets connected to two fuel tanks and a fuel outlet connected to the motor. A valve actuator member is mounted in the first common passage for longitudinal sliding movement in response to unequal fuel pressure in the two fuel inlets sensed by two fuel pressure sensing elements, which may be spherical balls, connected to the actuator member. A second common passage is provided in the equalization valve with a return fuel inlet connected to the excess fuel outlet of the motor, and two return fuel outlets connected to the two fuel tanks. A pair of valve elements connected to the opposition ends of the actuator member are positioned in the second common passage to control the flow of return fuel through the return fuel outlets and thereby equalize the amount of fuel in the fuel tanks.

20 Claims, 2 Drawing Sheets

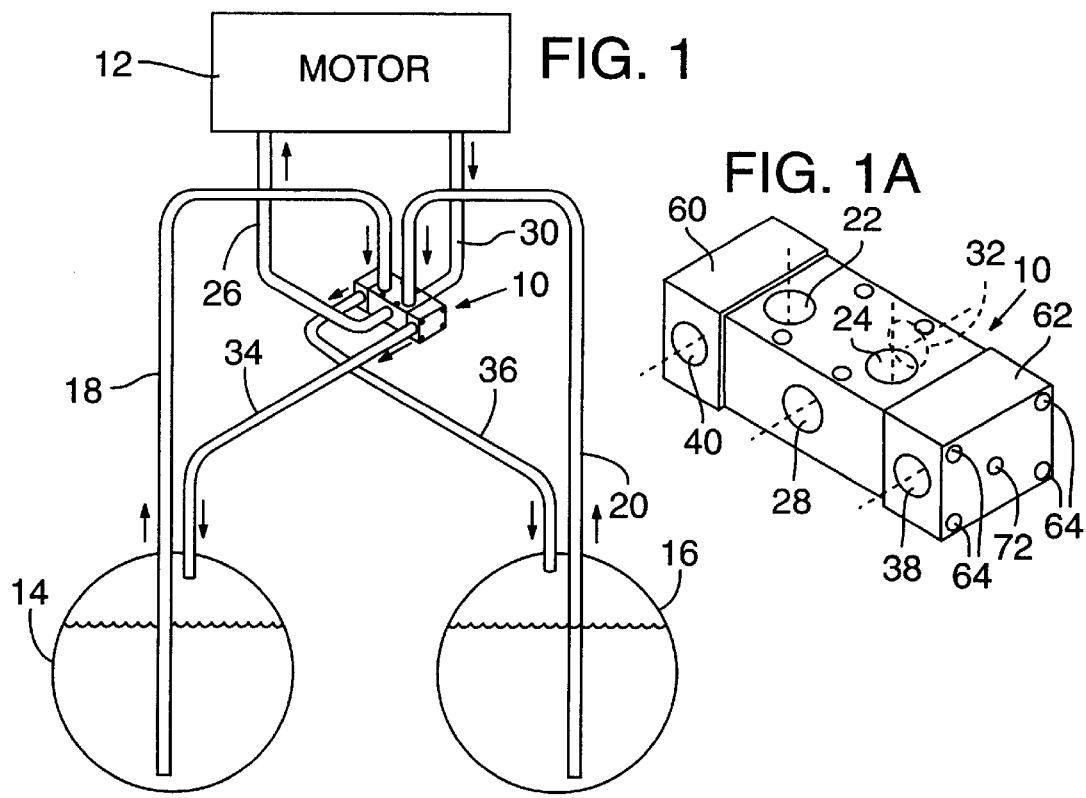
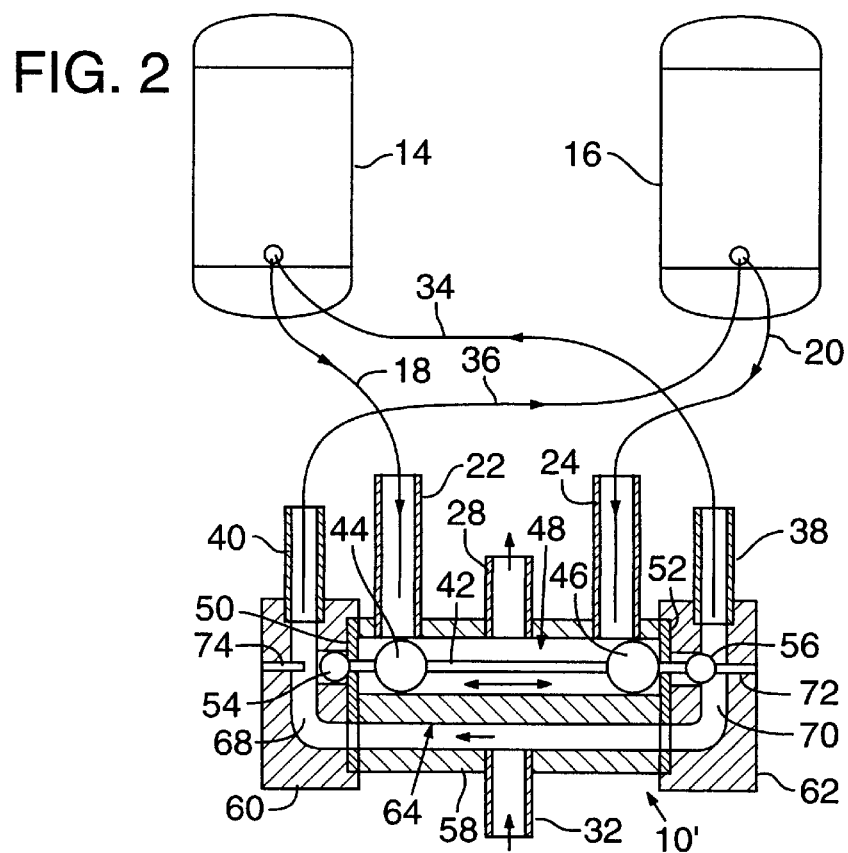

5,960,809

FUEL EQUALIZING SYSTEM FOR PLURALITY OF FUEL TANKS

BACKGROUND OF THE INVENTION

The present invention relates generally to fuel equalizing systems and methods for equalizing the fuel in a plurality of fuel tanks mounted on motor vehicles such as trucks in order to maintain substantially the same amount of fuel in each tank. The fuel equalizing system and method of the present invention employs an equalization valve which senses the pressure in the fuel outlet of each fuel tank and controls the return flow of unused fuel from the motor to such tanks in order to equalize the amount of fuel in the tanks. The equalization valve includes a valve actuator member having at least two pressure sensing elements on such actuator member which sense the pressure at the outlets of two fuel tanks and cause the actuator member to move longitudinally to operate the valve in accordance with the tank pressure. A pair of valve elements are provided at the opposite ends of the actuator member to control the flow of unused return fuel flowing from the motor through two return fuel outlets of the valve back into the two fuel tanks. The valve elements are moved by the actuator member to control the return fuel flow by varying the spacing between each valve element and its associated stop.

The fuel equalization system of the present invention is especially useful for diesel engines on trucks in order to equalize the amount of fuel in two or more fuel tanks on such trucks, but is also useful for other motor vehicles including boats and airplanes.

It has previously been proposed in U.S. Pat. No. 2,860,651 of Davies, issued Nov. 18, 1958 and U.S. Pat. No. 2,860,652 of Badger, issued Nov. 18, 1958, to provide an apparatus for controlling the emptying of two fuel tanks on an airplane including a control valve having two pressure sensing chambers which sense the pressure within the two fuel tanks to operate a valve actuator which has its opposite ends connected to flexible diaphragms in such chambers. Each of the two separate sensing chambers is divided by a diaphragm into two separate sealed chambers, one of which is connected to the tank air pressure above the fuel in the tank and the other of which is connected to the fuel pressure within the tank. The two tanks in the fuel system of the Badger patent are interconnected by a modulating valve also having a flexible diaphragm therein and having an outlet connection to the pressure actuator control valve. The fuel equalizing valve of the present invention differs from that of the above cited patents by fuel pressure sensors not employing flexible diaphragms which are subject to wear, but rather employing spherical ball sensor elements on a valve actuator member to sense the pressure difference at the fuel outlets of the two fuel tanks. This moves the actuator member and two valve elements on such actuator member to control the return flow of unused fuel from the motor though valve into such tanks to equalize the amount of fuel in the tanks. The equalizing valve of the present invention is therefore much simpler, less expensive and more trouble-free in operation than that of the prior fuel equalizing system of such patents.

U.S. Pat. No. 4,722,358 of Christensen, dated Feb. 2, 1988, shows a pressure equalizing spool valve including a pair of sliding cylindrical valve elements at the opposite ends of a connecting rod which move in accordance with the pressure difference between a pair of pressure sensing ports in the opposite ends of the valve casing in communication with the bore passage of such sliding valves. Unlike the present invention, the valve is not provided with spherical sensing balls attached to the actuator member for sensing the pressure difference between the outlets of two fuel tanks and does not control the return flow of unused fuel from the motor to the fuel tanks in the manner of the present invention. U.S. Pat. No. 2,483,312 of Clay issued Sep. 27, 1949 shows a hydraulic pressure spool valve including a sliding valve actuator and a pair of pistons, the opposite ends of which engage two loose spherical valve elements. In their closed position the spherical valve elements engage valve seats to close the valve passages, but are urged against adjustable stops at the opposite ends of the valve in the open position of such valve elements. However, unlike the equalizer valve of the present invention, there are no spherical sensing elements attached to a valve actuator member for moving such actuator member and valve elements at the opposite ends thereof to change the spacing between such valve elements and adjustable stops in order to control the return flow of unused fuel from the motor to the fuel tanks in the manner of the present invention.

SUMMARY OF THE INVENTION

It is therefore one object of the present invention to provide an improved fuel equalizing system and method for equalizing fuel in a plurality of fuel tanks in a simple, inexpensive and trouble-free manner.

Another object of the invention is to provide such a fuel equalizing system and method which employs a simplified equalizer valve including an actuation member having a pair of pressure sensing elements mounted thereon for sensing the fuel pressure at the outlets of two fuel tanks movement of such actuator member to operate valve elements at the opposite ends thereof to equalize the fuel in such fuel tanks.

A fourth object of the invention is to provide such a fuel equalizing system and method for supplying fuel to a motor in which the equalizer valve is employed to control the return flow of unused fuel from the motor back to a plurality of fuel tanks through such valve to equalize the fuel content of the fuel tanks.

An additional object of the present invention is to provide such a fuel equalizing system and method including an equalizer valve having a valve actuator member connected to a pair of pressure sensing elements in a first common passage to sense the fuel pressure at the outlets of two different fuel tanks, and having a pair of valve elements at the opposite ends of the actuator member in order to control the return flow of excess fuel from the motor to the fuel tanks through a second common passage in such valve by moving the valve elements in the paths of two return outlet conduits.

Still another object of the present invention is to provide such a fuel equalizing system in which the valve elements engage adjustable stops provided in the second common passage through which the return fuel flows in order to limit the movement of one valve element by engagement with its associated stop while spacing the other valve element from its associated stop to allow more return flow to flow past it back to the fuel tank.

Still a further object of the invention is to provide a method of equalizing the amount of fuel in a plurality of fuel tanks connected to the same motor by controlling the return flow of unused excess fuel from the motor to the fuel tanks through an equalizing valve with pressure sensing elements that sense fuel tank outlet pressure and move a valve actuator member.

BRIEF DESCRIPTION OF THE DRAWINGS

Other objects and advantages of the present invention will be apparent from the following detailed description of preferred embodiments thereof and from the attached drawings of which:

FIG. 1 is a schematic diagram of the fuel equalizing system of the present invention showing a equalizing valve connected to a motor and to a pair of fuel tanks;

FIG. 1A is an enlarged view of the equalizing valve used in the system of FIG. 1;

FIG. 2 is a partial enlarged section view of the equalizer valve of FIGS. 1 and 1A connected to the fuel tanks shown in top plan view and with the two fuel pressure sensing inlets of the valve rotated 90 p and shown in the same plane as the other inlets and outlets of such valve for purposes of clarity;

Figure 3:
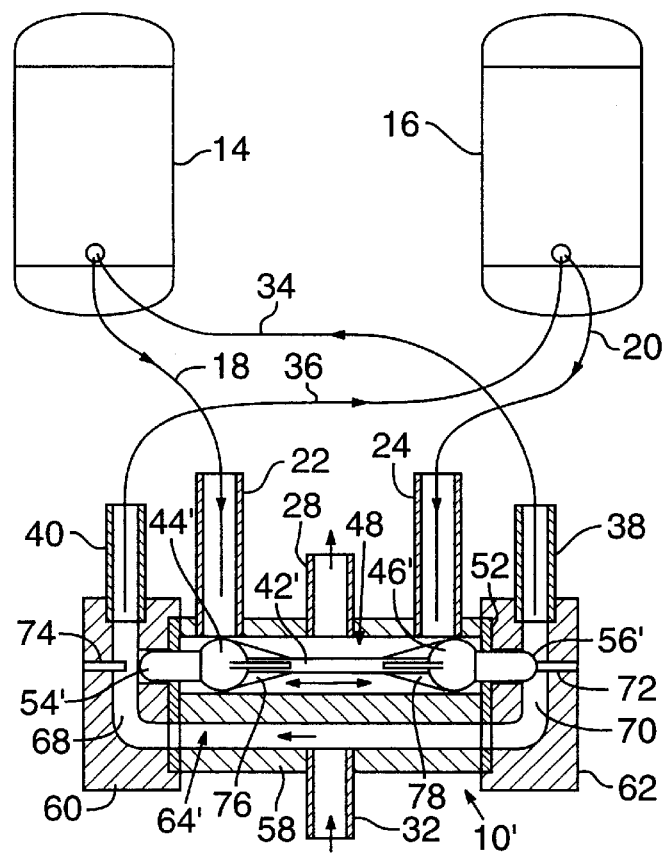
FIG. 3 is a partial section view showing another embodiment of the equalizer valve which employs fins on the actuator member to assist in rotational movement of the valve actuator member, and hemispherical valve elements connected thereto.

The foregoing and other objects, features, and advantages of the invention will become more apparent from the following detailed description of a preferred embodiment which proceeds with reference to the accompanying drawings.

DETAILED DESCRIPTION OF EMBODIMENTS

As shown in FIGS. 1 and 1A, the fuel equalizing system of the present invention includes an equalizer valve 10 connected between a motor 12 and a pair of fuel tanks 14 and 16. The motor 12 may be the diesel engine of a truck or the internal combustion engine of another motorized vehicle such as a boat or airplane. The fuel tanks 14 and 16 have fuel outlet conduits 18 and 20 respectively, connected to fuel inlets 22 and 24 on the top of the equalizer valve 10. The motor 12 is connected by a fuel inlet conduit 26 to a fuel outlet 28 on the front of the equalizer valve. An unused fuel return outlet conduit 30 is connected from the motor 12 to a fuel return inlet 32 on the back of the valve 10. A pair of fuel return conduits 34 and 36 are connected to the fuel tanks 14 and 16, respectively, from two fuel return outlets 38 and 40 respectively, on the front of the valve 10.

As shown in FIG. 2, the equalizer valve 10 includes a valve actuator member 42 in the form of a cylindrical rod having a pair of spherical pressure sensor elements 44 and 46 mounted in spaced positions on such actuator member in alignment with the fuel inlets 22 and 24, respectively, to sense the fuel pressure in the outlet conduits 18 and 20 of fuel tanks 14 and 16. Thus the fuel pressure is sensed by sensor elements 44 and 46 as fuel flows through inlets 22 and 24 into a first common passage 48 of the valve 10 and out through the fuel outlet 28 which is connected by outlet conduit 26 to the motor 12 as shown in FIG. 1. The pressure sensor elements 44 and 46 are preferably spherical balls made of metal such as aluminum or of a suitable plastic material such as nylon or Delrin acetal resin and may be formed integral with actuator member 42 by molding. However, the sensor balls may also be formed as separate elements and secured to a metal rod actuator member 42 in any suitable manner, such as by threaded fastening. The opposite ends of the valve actuator member 42 extend through openings in two end walls 50 and 52 of the first common passageway 48. The end walls are gaskets of rubber or other elastomer material forming liquid-tight seals between three sections of the valve housing. The actuator rod ends are connected to valve elements 54 and 56, and extend through small diameter openings in gaskets 50 and 52 which form sliding seals with such rod.

The valve housing of the equalizing valve 10 is preferably made of any suitable metal such as aluminum, including a center section 58 and two end sections 60 and 62, which are each joined to such center section in any suitable manner, such as by four screws 64, as shown in FIGS. 1A and 2. The opposite end sections 60 and 62 are separated from the center section 58 by the gaskets 50 and 52, which form the end walls of the first common passage 48 in such center section. A second common passage 64 is formed in the center section 58 and in the end sections 60 and 62 to interconnect the fuel return inlet 32 with the fuel return outlets 38 and 40 through large diameter openings in gaskets 50 and 52. The fuel return outlets 38 and 40 are connected by conduits 34 and 36, respectively, to the fuel tanks 12 and 16. It should be noted that in FIG. 2, the fuel tanks 14 and 16 are shown from a top plane view, so that both the fuel outlet conduits 18 and 20 and the fuel return inlets 34 and 36 enter the same fitting on the top of the tank in accordance with FIG. 1. Also the fuel inlets 22 and 24 of the valve are shown rotated 90 degrees in FIG. 2 from their position in FIG. 1A for clarity.

The valve elements 54, and 56 attached to the opposite end of actuator member 42 extend into branches 66 and 68 respectively of the second common passageway 64. They are partially aligned with the return outlets 38 and 40 when they are in a fully extended position such as valve element 56 is shown in FIG. 2. In this extended position, the valve element 56 engages a first adjustable stop 72 which is threaded through the wall of end section 62 of the housing. A second adjustable stop 74 is threaded through the wall of the housing end section 60 in position to engage the other valve lement 52 when the actuator rod 42 is moved to the left extended position away from the position shown in FIG. 2.

The pressure sensor elements 44 and 46 attached to the actuator rod 42 sense the fuel pressure in the fuel inlets 22 and 24 and cause the actuator rod to move either left or right longitudinally in the first common passage 48 depending upon which pressure is higher. This causes the valve elements 54 and 56 to be extended further into the second common passageway 64 in order to control the flow of return fuel from the return inlet 32 through the return fuel outlets 38 and 40 thereby equalizing the amount of fuel in the fuel tanks 14 and 16. It should be noted that while the valve elements 54 and 56 are shown to be small spherical balls in the embodiment of FIG. 2, they may be of a different configuration as hereafter discussed with respect to FIGS. 3 and 4.

As shown in FIG. 3, another embodiment of the equalizer valve 101 of the present invention is similar to that previously described with respect to FIG. 2 except that the sensor elements 44' and 46' and the actuator member 42' are attached to two spaced sets of fins 76 and 78. Four fins 76 are provided on the actuator rod and joined to the second sensor ball 44, and four other fins 78 are provided on the actuator rod and joined to the second sensor ball 46'. The fins, sensor balls and actuator rod may all be molded as one integral plastic member out of nylon or Delrin acetal resin. These fins cause the actuator shaft and the sensor balls to rotate for better fuel flow, and for improved longitudinal sliding operation of the valve actuator member. In addition, modified valve elements 54' and 56' of hemispherical shape may be used rather than being the spherical balls of FIG. 2. Thus, the valve elements may be provided as hemispherical end portions of the actuator rod 42 which are joined to the sensor balls 44' and 46' by intermediate shaft portions of the same diameter as such hemispheres where they extend through small holes in the end wall gaskets 50 and 52.

Figure 4:
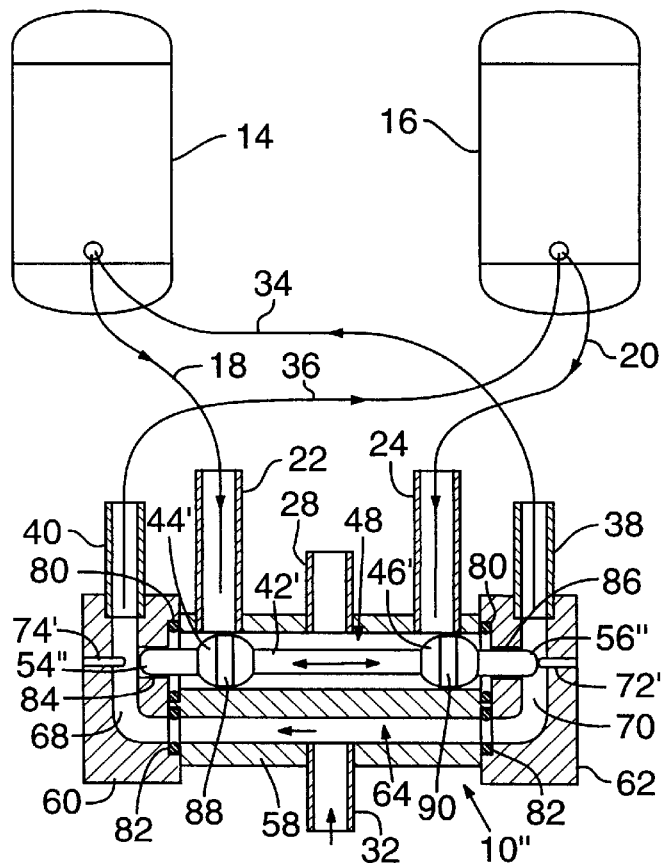
FIG. 4 is a partial section view of a third embodiment of the equalizer valve which is similar to that of FIG. 2, but does not employ sealing gaskets or spherical valve elements but rather employs O-ring seals and hemispherical ends of the actuator rod as valve elements.

FIG. 4 shows a third embodiment of equalizer valve 10" of the invention which is similar to that of FIG. 2 except for the use of two O-rings 80 and 82 of elastomer material for each of the sealing gaskets 50 and 52 and the use of modified valve elements 54" and 56" which are of a hemispherical shape, rather than spherical. Also, the valve actuator rod 42" and the valve elements 54" and 56" at the opposite ends thereof are of larger diameter than rod 42 shown in FIG. 2. In addition, the annular valve elements 54" and 56" extend through annular passages 84 and 86 in the housing end sections 60 and 62, respectively, which are of only slightly greater diameter than such valve elements for minimum fuel leakage. Of course, other changes could be made in the actuator rods of FIG. 4 such as by providing the pressure sensing balls 44' and 46' with cylindrical center sections 88 and 90 and by providing the stops 72' and 74' as fixed elements with hemispherical ends that engage valve elements 56" and 54", respectively.

It will be apparent to those having ordinary skill in the art that many changes may be made in the above-described details of the preferred embodiments of the present invention while still providing the advantages of the invention. Therefore the scope of the present invention should be determined by the following claims.

I claim:

1. Fuel system for equalizing fuel in several fuel tanks of a motor vehicle, comprising:

a plurality of fuel tanks including a first tank and a second tank;

an equalizer valve including a first fuel inlet connected to an outlet of the first tank, a second fuel inlet connected to an outlet of the second tank and a fuel outlet adapted to supply fuel to a motor, and a first common passage connecting said first and second fuel inlets to said fuel outlet;

a valve actuator ,member mounted in said first common passage for longitudinal movement;

a pair of spaced sensor elements attached to said actuator member and positioned in said first common passage to sense fuel pressure in different ones of the first and second fuel inlets and to move the actuator member longitudinally in opposite directions depending upon which of said fuel inlets has the greater fuel pressure;

said valve also including a fuel return inlet adapted to receive excess fuel returning from the motor, first and second return outlets connected, respectively, to the first fuel tank and to the second fuel tank, and a second common passage connecting said first and second return outlets to the fuel return inlet; and a pair of return valve elements mounted on said actuator member for movement therewith in said second common passage between open and restricted positions in alignment with a different one of said first and second return outlets to vary the fuel flow therein so that more return fuel flows to the fuel tank containing less fuel to increase its outlet fuel pressure as detected by the associated sensor element and thereby equalize the fuel content of said first and second tanks.

2. A fuel system in accordance with claim 1 in which first and second stops are provided in the first and second return outlets respectively, to limit the movement of the valve closure elements in their closed positions.

3. A fuel system in accordance with claim 2 in which the stops are adjustable.

4. A fuel system in accordance with claim 1 in which the sensor elements are spherical.

5. A fuel system in accordance with claim 1 in which the valve actuator member is a spool valve member which is moved longitudinally by the sensor elements.

6. A fuel system in accordance with claim 1 in which the return valve elements are spherical.

7. A fuel system in accordance with claim 6 in which the valve elements are attached to the opposite ends of the actuator member, said opposite ends extending through the end walls of the first common passage into the second common passage.

8. A fuel system in accordance with claim 1 in which the return valve elements are at the opposite ends of the actuator member which extend through the end walls of the first common passage into the second common passage.

9. A fuel system in accordance with claim 4 in which the actuator member has vanes which cause the actuator member to rotate as fuel flows past said vanes.

10. A fuel system in accordance with claim 1 in which the sensor elements are made of a plastic material.

11. Fuel system for equalizing fuel in several fuel tanks of a truck, comprising:

an equalizer valve including a first fuel inlet adapted to be connected to the outlet of a first fuel tank, a second fuel inlet adapted to be connected to the outlet of a second fuel tank, a fuel supply outlet adapted to supply fuel to the motor of a truck, and a first common passage connecting said first and second fuel inlets to said fuel supply outlet;

a valve actuator member mounted in said first common passage for movement therein;

a pair of spaced sensor elements attached to said actuator member and positioned in said first common passage to sense fuel pressure in different ones of said first and second fuel inlets and to move the actuator member in opposite directions depending upon which of said fuel inlets has the greater fuel pressure;

said valve including a fuel return inlet adapted to be connected to the excess fuel return of the motor, first and second return outlets connected, respectively, to the first and second fuel tanks, and a second common passage connecting said first and second return outlets to the fuel return inlet; and a pair of valve elements mounted on said actuator member for movement therewith in said second common passage between open and restricted positions in communication with a different one of said first and second return outlets to vary the fuel flow therein so that more return fuel flows to the fuel tank containing less fuel to increase its fuel pressure as detected by the associated sensor element and thereby equalize the fuel content of said first and second tanks.

12. A fuel system in accordance with claim 11 in which the truck has a diesel engine as its motor and the equalizer valve is connected to diesel fuel tanks.

13. A fuel system in accordance with claim 11 in which first and second adjustable stops are provided in the first and second return outlets respectively, to limit the movement of the valve elements in their restricted positions.

14. A fuel system in accordance with claim 11 in which the sensor elements are spherical.

15. A fuel system in accordance with claim 11 in which the actuator member is a rod which is moved longitudinally by the sensor elements.

16. A method of equalizing the amount of fuel in a plurality of fuel tanks connected to the same motor, comprising the steps of:

withdrawing fuel from at least two fuel tanks simultaneously through two outlet conduits and supplying such fuel to the motor through an inlet supply conduit;

returning unused excess fuel from the motor through an outlet return conduit to the two fuel tanks through two inlet return conduits;

sensing the fuel pressure in the two outlet conduits to determine which is greater;

controlling the flow of the excess fuel returning to said two fuel tanks with an equalizer valve in response to the sensed fuel pressure in the two outlet conduits; and adjusting the positions of two return valve elements in said valve in response to the sensed fuel pressure, each valve element controlling the fuel flow in a different one of the two inlet return conduits to reduce the amount of excess fuel returned to the fuel tank which contains more fuel and has a corresponding higher fuel pressure in its outlet conduit.

17. A method in accordance with claim 16 in which the equalizer valve has a first common passage connecting the two outlet conduits to the inlet conduit, two sensor elements in said first common passage each in position to sense the fuel pressure in different one of said two outlet conduits, and a valve actuator member connected between said two sensor elements.

18. A method in accordance with claim 17 in which the equalizer valve has a second common passage connecting the two inlet return conduits to the outlet return conduit, and the two valve elements are in said second common passage, said valve elements being connected to the valve actuator member for movement in response to movement of the two sensor elements in the first common passage.

19. A method in accordance with claim 18 in which the valve has a pair of adjustable stops mounted in said second common passage which are adjusted to limit the movement of said valve elements in their restricted flow positions.

20. A method in accordance with claim 17 in which the two sensor elements are spherical.

\* \* \* \* \*